Figure 1:
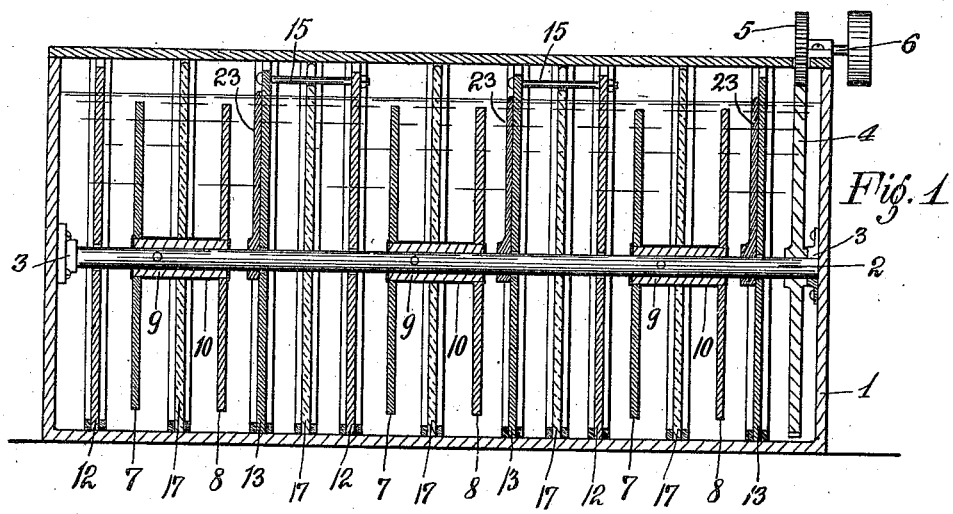

F. W. SPANUTIUS.
ELECTRIC PRIMARY BATTERY.
APPLICATION FILED MAR. 21, 1905.

983,175.

Patented Jan. 31, 1911.

UNITED STATES PATENT OFFICE.

FREDERICK W. SPANUTIUS, OF JERSEY CITY, NEW JERSEY, ASSIGNOR TO HALSEY ELECTRIC GENERATOR COMPANY, OF JERSEY CITY, NEW JERSEY.

ELECTRIC PRIMARY BATTERY.

983,175.      Specification of Letters Patent.      Patented Jan. 31, 1911.

Application filed March 21, 1905. Serial No. 251,225.

*To all whom it may concern:*

Be it known that I, FREDERICK W. SPANUTIUS, a citizen of the United States, residing at Jersey City, in the county of Hudson and State of New Jersey, have invented certain new and useful Improvements in Electric Primary Batteries, of which the following is a full, clear, and exact specification.

My invention relates to primary batteries, and has special reference to batteries using a common solution and having movable elements.

The object of my invention is to produce an efficient battery and one in which the current passes through the battery from one terminal to another, using for intermediate connections between the several cells constituting the battery, a conductor passing through the wall of each cell from the negative element of that cell to the positive element of the next cell.

The great difficulty in the employment of primary cells with movable elements lies in taking off the current from the element while it is in motion, as the fluid of the battery forms a film between any brush and the element in such a way as to decrease the amount of current to be taken off; and where brushes are used to take off the current there is always an imperfect contact due to the failure caused first, by lack of proper surface contact, and secondly, by the formation or accumulation of substances whose conductivity is so low as to impede the passage of the current, or make such contact impossible; and also by the impossibility of securing a perfect alinement between the brush and the element. To obviate these difficulties, I have recourse to the construction illustrated in the drawings described in this specification, and more especially pointed out in the claims following the specification.

Figure 2:
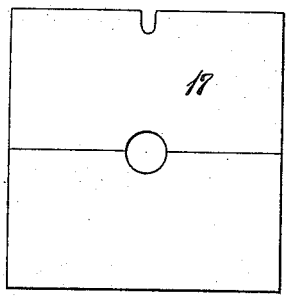

Figure 1 is a vertical section of the box or vessel containing the battery; Fig. 2 is an end elevation showing the partition between each cell hereinafter described.

1 is a tank or receptacle constructed of glass, porcelain, rubber or other non-conducting material not attacked by the electrolyte.

2 is a longitudinal shaft mounted in bearings 3 and driven by gears 4, 5, from the driving shaft 6 carried at the top of the casing. Mounted in pairs on the shaft 2 and rotating therewith, are a series of movable elements 7, 8; the elements 7 being for example, carbon, and the elements 8 being zinc. The adjacent zincs and carbons are electrically connected by a conductor 9 of high conductivity, such as copper, or metal not attacked by the electrolyte. If copper or similar material be used, it may be covered with protecting insulation 10. The function of the conductors 9 is to replace the outside connections heretofore used in connecting a number of cells in series, and by this means, and the arrangement of the fixed elements, in conjunction with separators for the individual couples, I have provided a mechanically depolarized battery composed of any desired number of cells in which moving contacts are entirely dispensed with. The fixed elements 12, 13, for example zinc and carbon respectively, comprise one or more plates slotted to permit the removal of the shaft and held in grooves or by other means preventing accidental displacement. The fixed elements 12, 13, are connected electrically by conductors 15, which may pass outside the electrolyte. In order to divide the fixed and movable elements into couples, I provide separator plates 17, composed of glass or similar non-conducting material, and held against displacement by means similar to that used for the fixed plates. Each separator is divided into two parts having a semi-circular aperture for the reception of the shaft. The aperture is preferably slightly larger than the shaft so that a space is formed through which the electrolyte may circulate. There will be a very slight leakage of current through this aperture, which may if desired, be prevented by causing the separator plates to closely fit the shaft, either construction being within my invention. The loss of current by leakage will be compensated for by the gain due to the absence of moving contacts and the better circulation of the electrolyte. The separator plates may be fitted to each other so that there will be practically no current leakage.

23 are brushes mounted on the shaft 2 and rotating therewith to mechanically depolarize the negative elements, where desired.

It will thus be seen that I have provided a battery with or without a common solution in which all of the advantages of mechanically depolarized batteries are secured without the use of sliding contact for collecting the current, the current being taken from the end terminals, which are always fixed, and that the zinc element may be easily renewed when necessary.

I do not restrict myself to the precise construction I have described, as many modifications and changes may be made without departing from the scope of the invention.

Having thus described my invention, I declare that what I claim as new and desire to secure by Letters Patent, is,—

1. A battery comprising a plurality of cells connected in series and each having a movable and a fixed element, the series connections between the cells being fixed relatively to the elements which they connect, substantially as described.

2. A battery comprising a plurality of cells connected in series and each having a movable and a fixed element, the series connections between the cells being fixed relatively to the elements which they connect, and a shaft on which said movable elements are mounted passing through all of said cells, substantially as described.

3. In a battery composed of a plurality of cells, the combination with a shaft carrying a movable element of each cell, of a fixed element for adjacent cells, and a series connection between said cells comprising connections between the respective movable elements of adjacent cells, and connections between the respective fixed elements of each cell, and a common electrolyte, substantially as described.

4. In a battery composed of a plurality of cells, the combination with a shaft carrying a movable element of each cell, of a fixed element for adjacent cells, and a series connection between said cells comprising connections between the movable elements of adjacent cells, and connections between the fixed elements of adjacent cells, substantially as described.

5. In a battery, the combination with a shaft, of pairs of electrically connected positive and negative elements mounted thereon, a fixed element of opposite polarity adjacent each movable element, separators through which said shaft and the connection between the elements of each pair passes, and fixed elements of opposite polarity to each movable element, substantially as described.

6. In a battery, the combination with a shaft, of pairs of electrically connected positive and negative elements mounted thereon, a fixed element of opposite polarity adjacent each movable element, separators through which said shaft passes for dividing said elements into couples, and means for connecting the fixed element of one cell to the fixed element of the adjacent couple, substantially as described.

7. In a battery having a common electrolyte, the combination with a shaft carrying positive and negative elements electrically connected, of fixed elements adjacent said movable elements, and means dividing said elements into couples and for preventing short circuiting between the elements of any couple, substantially as described.

8. In a battery, the combination with a shaft, of positive and negative elements mounted thereon and electrically connected by means rotating with the shaft, a fixed element adjacent each of said movable elements, and an electrolyte, substantially as described.

9. In a battery, the combination with a shaft, of pairs of electrically connected positive and negative elements mounted thereon, a non-conducting separator between said elements, and fixed negative and positive elements respectively adjacent said movable positive and negative elements, substantially as described.

10. The combination with a separator, of a shaft passing therethrough carrying a carbon and a zinc element connected together, and fixed zinc and carbon elements on opposite sides of said separator, substantially as described.

11. In a battery, a separator for adjacent cells comprising a removable non-conducting plate, said plate being centrally divided and having a cut-away portion for the passage of a shaft, substantially as described.

12. In a battery, the combination with a shaft carrying movable elements of adjacent cells, and a separator between said elements, of a conductor carried by said shaft and fixedly connecting said two movable elements, substantially as described.

In testimony whereof I affix my signature, in presence of two witnesses.

FREDERICK W. SPANUTIUS.

Witnesses:
HOWARD H. WILLIAMS,
HERBERT SCHUBERT.